(12) United States Patent
Kim et al.

(10) Patent No.: US 12,260,040 B2
(45) Date of Patent: Mar. 25, 2025

(54) STYLUS DRIVING APPARATUS AND ELECTRONIC DEVICE COMPRISING SAME

(71) Applicant: HiDeep Inc., Seongnam-si (KR)

(72) Inventors: Bonkee Kim, Seongnam-si (KR); Seyeob Kim, Seongnam-si (KR); Youngho Cho, Seongnam-si (KR); Jongsik Kim, Seongnam-si (KR); Hwanhee Lee, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/264,274

(22) PCT Filed: Jan. 19, 2022

(86) PCT No.: PCT/KR2022/001002
§ 371 (c)(1),
(2) Date: Aug. 4, 2023

(87) PCT Pub. No.: WO2022/169138
PCT Pub. Date: Aug. 11, 2022

(65) Prior Publication Data
US 2024/0094842 A1 Mar. 21, 2024

(30) Foreign Application Priority Data
Feb. 4, 2021 (KR) .................. 10-2021-0016160

(51) Int. Cl.
*G06F 3/041* (2006.01)
*G06F 3/0354* (2013.01)
(Continued)

(52) U.S. Cl.
CPC ...... *G06F 3/04162* (2019.05); *G06F 3/03545* (2013.01); *G06F 3/0383* (2013.01);
(Continued)

(58) Field of Classification Search
CPC .. G06F 3/04162; G06F 3/0441; G06F 3/0442; G06F 3/0446; G06F 3/03545; G06F 3/0383; G06F 3/046
See application file for complete search history.

(56) References Cited

U.S. PATENT DOCUMENTS 9,189,087 B2 11/2015 Kim
9,619,086 B2 4/2017 Park et al.
(Continued)

FOREIGN PATENT DOCUMENTS

KR 101209514 B1 12/2012
KR 20140021815 A 2/2014
(Continued)

OTHER PUBLICATIONS

International Search Report issued in PCT Published Application No. WO 2022/169138 (A1).

*Primary Examiner* — Lisa S Landis
(74) *Attorney, Agent, or Firm* — The Belles Group, P.C.

(57) ABSTRACT

Provided is an electronic device including a panel including a plurality of first electrodes extending in a Y-axis and a plurality of second electrodes extending in an X-axis, a driving part configured to individually control a direction of current flowing through the plurality of first electrode and the plurality of second electrodes so as to generate electromagnetic fields, thereby driving a stylus, and a determination part configured to receive a signal generated in the stylus so as to determine touch coordinates. Each of the plurality of first electrodes and the plurality of second electrodes does not form a closed loop. In the electronic device and a stylus driving device according to the embodiment of the present invention, since a separate configuration such as a digitizer, an antenna, and the like is not required, (Continued)

the product may be miniaturized and thinned, and the manufacturing cost may be reduced.

13 Claims, 7 Drawing Sheets

(51) Int. Cl.
  *G06F 3/038*  (2013.01)
  *G06F 3/044*  (2006.01)
  *G06F 3/046*  (2006.01)
(52) U.S. Cl.
  CPC .......... *G06F 3/0441* (2019.05); *G06F 3/0442* (2019.05); *G06F 3/0446* (2019.05); *G06F 3/046* (2013.01)

(56)  References Cited

U.S. PATENT DOCUMENTS

| | | | |
|---|---|---|---|
| 2014/0043283 | A1 | 2/2014 | Kim |
| 2014/0043284 | A1* | 2/2014 | Park .................. G06F 3/0445 345/174 |
| 2015/0002425 | A1* | 1/2015 | Lee .................. G06F 3/0416 345/173 |
| 2020/0249791 | A1 | 8/2020 | Kim et al. |

FOREIGN PATENT DOCUMENTS

| | | |
|---|---|---|
| KR | 20140022222 A | 2/2014 |
| KR | 20160083379 A | 7/2016 |
| KR | 20200095978 A | 8/2020 |

* cited by examiner (a)

(b)

(c)

STYLUS DRIVING APPARATUS AND ELECTRONIC DEVICE COMPRISING SAME

CROSS-REFERENCE TO RELATED APPLICATIONS

This U.S. non-provisional patent application is a U.S. national stage application under 35 U.S.C. § 371 of PCT Application No. PCT/KR2022/001002, filed Jan. 19, 2022, which claims priority to Korean Patent Application No. 10-2021-0016160, filed on Feb. 4, 2021. The disclosures of the aforementioned priority applications are incorporated herein by reference in their entireties.

BACKGROUND

The present disclosure herein relates to a stylus driving device and an electronic device including the same, and more particularly, to a driving device and an electronic device, which are capable of driving a stylus without a separate configuration such as a digitizer, an antenna, and the like, and recognizing a touch by the stylus.

Touch sensors are provided in various electronic devices such as mobile phones, smart phones, tablet PCs, laptop computers, wearable devices, and navigation devices. Such a touch sensor may be disposed on a display panel that displays an image or may be disposed on one area of a body part of an electronic device.

The touch sensor provides an intuitive user interface in manipulating the electronic device. Recently, a stylus for precise touch input has been commercialized, and the stylus transmits and receives signals with a touch sensor through an electrical and/or magnetic method.

The use of the stylus has improved precision of the touch manipulation, but requires a separate configuration for driving the stylus and receiving a signal. For example, to drive a stylus using an electro-magnetic resonance (EMR) method, a separate component such as a digitizer is required. The digitizer has to transmit an electromagnetic signal to the stylus and receive a resonance signal from the stylus.

This conventional method has resulted in greatly improved writing/drawing quality, which is a core function of the stylus, but since a separate EMR sensor panel and EMR driving IC have be added in addition to the touch panel, a thickness of the product increases, and also, a manufacturing cost increases.

In consideration of these limitations, various types of styluses have appeared, but limitations such as the need for separate components and the complexity of circuits and sensing algorithms still exist.

SUMMARY

The present disclosure provides a driving device and an electronic device, which are capable of driving a stylus without a separate configuration such as a digitizer, an antenna, and the like, and recognizing a touch by the stylus. The present disclosure also provides a driving device and an electronic device, which are capable of using a stylus while employing an existing touch panel.

An embodiment of the present invention provides an electronic device including: a panel including a plurality of first electrodes extending in a Y-axis and a plurality of second electrodes extending in an X-axis; a driving part configured to individually control a direction of current flowing through the plurality of first electrode and the plurality of second electrodes so as to generate electromagnetic fields, thereby driving a stylus; and a determination part configured to receive a signal generated in the stylus so as to determine touch coordinates, wherein each of the plurality of first electrodes and the plurality of second electrodes does not form a closed loop.

In an embodiment of the present invention, a stylus driving device includes: a panel including a plurality of first electrodes extending in a Y-axis and a plurality of second electrodes extending in an X-axis; and a driving part configured to individually control a direction of current flowing through the plurality of first electrode and the plurality of second electrodes so as to generate electromagnetic fields, thereby driving a stylus, wherein each of the plurality of first electrodes and the plurality of second electrodes does not form a closed loop.

BRIEF DESCRIPTION OF THE FIGURES

The accompanying drawings are included to provide a further understanding of the present invention, and are incorporated in and constitute a part of this specification. The drawings illustrate embodiments of the present invention and, together with the description, serve to explain principles of the present invention. In the drawings.

DETAILED DESCRIPTION

Figure 1:
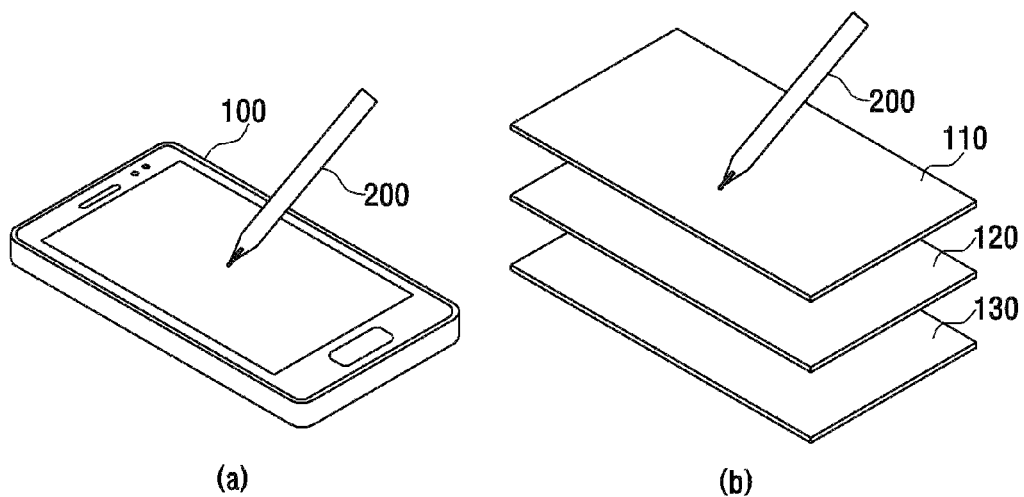
FIG. 1 is a perspective view of an electronic device according to an embodiment of the present invention.

The following detailed description of the present invention, which will be described below, refers to the accompanying drawings that illustrate a specific embodiment in which the present invention is capable of being practiced. These embodiments are described in sufficient detail to enable those skilled in the art to practice the present invention. It should be understood that the various embodiments of the present invention are different but need not be mutually exclusive. For example, specific shapes, structures, and characteristics described herein may be implemented in other embodiments without departing from the spirit and scope of the present invention with respect to one embodiment. In addition, it is to be understood that the location or arrangement of individual components in each disclosed embodiment may be changed without departing from the spirit and scope of the present invention. The following detailed description is, therefore, not to be taken in a limiting sense, and if properly explained, the scope of the present invention is defined only by the appended claims, along with the full scope of equivalents to which such claims are claimed. Like reference numerals in the drawings refer to the same or similar functions throughout the several aspects.

FIG. 1 is a perspective view of an electronic device according to an embodiment of the present invention.

In (a) of FIG. 1, an electronic device according to an embodiment of the present invention is shown as a smart phone, but is not limited thereto. For example, the electronic device may be implemented in various electronic devices such as tablet PCs, mobile phones, video phones, e-book readers, desktop personal computers, laptop personal computers, netbook computers, personal digital assistants (PDAs), portable multimedia players (PMPs), wearable devices (e.g. smart watches), kiosks, and the like.

As illustrated in (b) of FIG. 1, the electronic device 100 according to an embodiment of the present invention may include a touch panel 120. Here, a window 110 may be disposed above the touch panel 120, and a display panel 130 may be disposed below the touch panel 120. However, a layer structure may be changed according to embodiments. For example, the touch panel 120 may be disposed below the display panel 130, and a touch sensing module may be provided inside the display panel 130. Conversely, a display module may be provided in the touch panel 130.

The touch panel 120 may include a plurality of electrodes that detect a position of a touch when the touch is performed by the stylus. The plurality of electrodes may detect the touch by the stylus in a mutual capacitance method or a self-capacitance method. Here, the touch includes various touch types such as a proximity touch/hovering touch as well as a direct touch by the stylus.

The window 110 may be disposed on the touch panel 120 and may have a shape corresponding to the display panel 130. The window 110 covers at least a portion of a front surface of the display panel 130. For example, if the display panel 130 has a rectangular shape, the window 110 may also have a rectangular shape corresponding to the rectangular shape, and if the display panel 130 has a circular shape, the window 110 may also have a circular shape corresponding to the circular shape.

An image displayed on the display panel 130 is transmitted to the outside through the window 110. The window 110 mitigates an external impact to prevent the display panel 130 from being damaged or malfunctioned due to the external impact. The impact applied from the outside may be force applied from the outside, such as a pressure or stress and may mean physical force that may cause defects in the display panel 130. The window 110 may have flexibility by being entirely or at least partially made of a flexible material.

The display panel 130 may include a liquid crystal display (LCD), an organic light-emitting diode (OLED) display, an e-ink display, a quantum-dot light emitting display, a micro light emitting diode (LED) display, and the like, but is not limited thereto.

The touch panel 120 provided in the electronic device 100 according to an embodiment of the present invention may operate as a general touch sensing unit that detects an object such as a user's finger, but may further has a function of driving the stylus 200 and receiving a signal from the stylus to detect the touch by the stylus 200. The driving of the stylus 200 may mean a process of activating (current induction, resonance) a resonance circuit in the stylus 200 to make the stylus 200 in a state capable of emitting signals.

Figure 2:
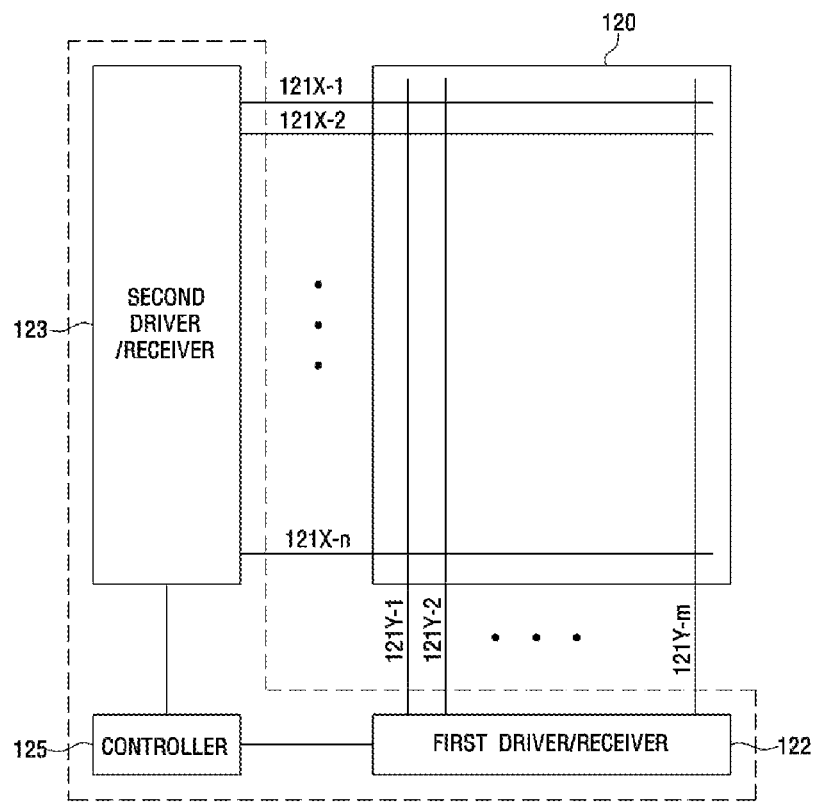
FIG. 2 is a view illustrating a structure of a touch panel provided in the electronic device according to an embodiment of the present invention.

FIG. 2 is a view illustrating a structure of the touch panel 120 provided in the electronic device 100 according to an embodiment of the present invention. As described above, the touch panel 120 may function as a driving device for driving the stylus 200. The touch panel 120 includes m first electrodes 121Y-1 to 121Y-m and n second electrodes 121X-1 to 121X-n. Where reference symbols n and m are natural numbers, and magnitudes of n and m may be determined according to a size, area, and shape of the electronic device 100.

When the first electrodes 121Y-1 to 121Y-m and the second electrodes 121X-1 to 121X-n are linear electrodes, the m first electrodes 121Y-1 to 121Y-m may be arranged in parallel to each other at the same or different spaced distances, and the n second electrodes 121X-1 to 121X-n may also be arranged in parallel to each other at the same or different spaced distances.

In addition, the first electrodes 121Y-1 to 121Y-n may extend in the Y-axis direction, and the second electrodes 121X-1 to 121X-m may extend in the X-axis direction to provide an orthogonal array. The m first electrodes 121Y-1 to 121Y-m and the n second electrodes 121X-1 to 121X-n may be disposed on the same layer or may be disposed on different layers.

The first electrodes 121Y-1 to 121Y-m and the second electrodes 121X-1 to 121X-n may have a shape, in which various unit electrodes are connected to each other, such as a circular shape and a polygonal shape, instead of the linear electrodes. For example, the first electrodes 121Y-1 to 121Y-m and the second electrodes 121X-1 to 121X-n may be provided as unit electrodes having a square, rhombus, or diamond pattern, and the unit electrodes may be connected to each other through a connection electrode or a bridge electrode.

When adopting this structure, the first electrodes 121Y-1 to 121Y-m and the second electrodes 121X-1 to 121X-n may be disposed on the same layer. Here, referring to a connection direction of the unit electrodes, the first unit electrode may be connected to the Y-axis direction to provide the first electrodes 121Y-1 to 121Y-m extending in the Y-axis direction. Similarly, the second unit electrodes may be connected in the X-axis direction to provide the second electrodes 121X-1 to 121X-n extending in the X-axis direction.

Referring to the arrangement of the individual unit electrodes, the first unit electrode constituting the first electrode and the second unit electrode constituting the second electrode may have a pattern that crosses each other. That is, a pattern in which one second unit electrode is surrounded by a plurality (e.g., four) of first unit electrodes, and one first unit electrode is surrounded by a plurality (e.g., four) of second unit electrodes may be provided.

In another embodiment, one of the first electrodes 121Y-1 to 121Y-m and the second electrodes 121X-1 to 121X-n may be provided as a bar-shaped electrode, and the other may be provided as a unit electrode. Specifically, a first electrode constituted by the plurality of unit electrodes may be disposed adjacent to the second electrode having a bar shape extending along the X-axis.

For understanding of description, hereinafter, the extension direction or arrangement of the first electrodes 121Y-1 to 121Y-m and the second electrodes 121X-1 to 121X-n, but not the shape or form (or shape or form of the unit electrode) of the first electrodes 121Y-1 to 121Y-m and the second electrodes 121X-1 to 121X-n, will be mainly described. That is, the first electrodes 121Y-1 to 121Y-m may correspond to electrodes extending in the Y-axis direction, and the second electrodes 121X-1 to 121X-n may correspond to electrodes extending in the X-axis direction. The first electrodes 121Y-1 to 121Y-m and the second electrodes 121X-1 to 121X-n may be orthogonal to each other, and the first electrodes 121Y-1 to 121Y-m and the second electrodes 121X-1 to 121X-n may be disposed on the same layer or on different layers.

The first electrodes 121Y-1 to 121Y-m may be connected to a first driver/receiver 122, and the second electrodes 121X-1 to 121X-n may be connected to a second driver/receiver 123. Although the first driver/receiver 122 and the second driver/receiver 123 are shown separately in FIG. 2, the first driver/receiver 122 and the second driver/receiver 123 may be implemented as a single module, unit, or chip. That is, the scope of the present disclosure is not limited to the hardware configuration of a driving/control unit. Various hardware components may be employed according to the type, function, performance, etc. of the electronic device 100 to substitute for functions such as a driving part for driving the stylus and a determination part for receiving signals from the stylus to detect touch coordinates.

The first driver/receiver 122 applies a driving signal to the first electrodes 121Y-1 to 121Y-m through a plurality of touch channels. The first driver/receiver 122 applies current having a predetermined magnitude and/or direction to the first electrodes 121Y-1 to 121Y-m. Similarly, the second driver/receiver 123 applies a driving signal to the second electrodes 121X-1 to 121X-n through the plurality of touch channels. The second driver/receiver 123 applies current having a predetermined magnitude and/or direction to the second electrodes 121X-1 to 121X-n.

Furthermore, the first driver/receiver 122 may receive a detection signal from the first electrodes 121Y-1 to 121Y-m, and the second driver/receiver 123 may receive a detection signal from the second electrodes 121X-1 to 121X-n). That is, in an embodiment of the present invention, the first driver/receiver 122 and the second driver/receiver 123 may operate as transceivers for transmitting and receiving a signal. Although not shown in the drawings, the first driver/receiver 122 and the second driver/receiver 123 may include a plurality of amplifiers, a plurality of differential amplifiers (or difference amplifiers), an analog to digital converter (ADC), and a signal processor to process or analyze a signal received from the stylus 200.

A controller 125 may include a micro control unit (MCU) that controls operations of the first driver/receiver 122 and the second driver/receiver 123 and obtains a touch position based on the received signal.

In the electronic device 100 according to an embodiment of the present invention, the driving part for operating a resonance circuit of the stylus may correspond to the first driver/receiver 122 and the second driver/receiver 123, but may correspond to the controller 125 for controlling the first driver/receiver 122 and the second driver/receiver 123. In addition, in the electronic device 100 according to an embodiment of the present invention, the determination part for determining the touch coordinates may correspond to the first driver/receiver 122 and the second driver/receiver 123 including a signal processor, but may correspond to the controller 125 for controlling the first driver/receiver 122 and the second driver/receiver 123.

Driving of Stylus

According to an embodiment of the present invention, magnetic fields may be generated using the touch panel to induce current to the resonance circuit of the stylus. Here, since each of the first electrodes 121Y-1 to 121Y-m and the second electrodes 121X-1 to 121X-n provided in the touch panel do not form a closed circuit, current flowing through each of the first electrodes 121Y-1 to 121Y-m and the second electrodes 121X-1 to 121X-n are individually controlled.

Figure 3:
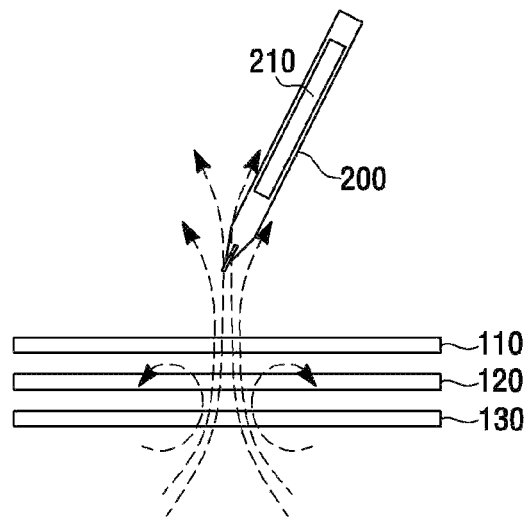
FIG. 3 is a schematic view for explaining a method for driving a stylus in the electronic device or a stylus driving device according to an embodiment of the present invention.
Figure 4:
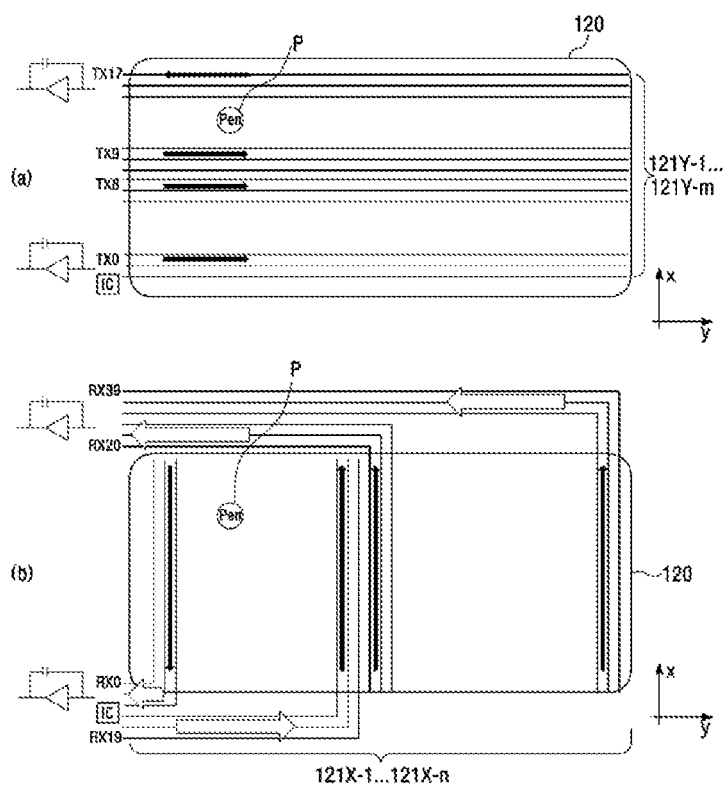
FIG. 4 is a view for specifically explaining a method for activating the stylus in the electronic device or the stylus driving device according to an embodiment of the present invention.

FIG. 3 is a schematic view for explaining a method for driving a stylus in the electronic device 100 or a stylus driving device according to an embodiment of the present invention, and FIG. 4 is a view for specifically explaining a method for activating the stylus in the electronic device 100 or the stylus driving device according to an embodiment of the present invention.

As illustrated in FIG. 3, the electronic device 100 according to an embodiment of the present invention generates magnetic fields using the touch panel 120, and the magnetic fields operates a resonance circuit 210 of the stylus 200. The resonance circuit 210 of the stylus 200 includes a capacitor and an inductor, and current is generated in the resonance circuit 210 of the stylus 200 by electromagnetic induction by electromagnetic fields generated by the touch panel 120.

The stylus 200 is provided in the form of a pen having a tip, and includes the resonance circuit 210 therein. A coil of the resonance circuit 210 may be offset from the tip by a predetermined distance. In a modified example, a portion of one end of the tip overlaps the coil, but the tip and the coil may be arranged so as not to be in contact with each other. The coil of the resonance circuit 210 may be disposed so as not to be in direct contact with the tip to reduce a position sensing error due to temperature change and/or mechanical stress transferred from the tip. The tip of the stylus 200 having the above configuration and the resonance circuit 210 may not be connected to the ground (GND).

In another embodiment, the tip may be a conductive tip, which may be connected to a capacitor and/or inductor of the resonance circuit 210 via a conductive connection member. The resonance circuit 210 may be connected to the ground (GND). The conductive connection member may be a wire, a pin, a rod, a bar, or the like. The capacitor of the resonance circuit 210 may be constituted by a plurality of unit capacitors connected in parallel to each other, and the unit capacitors may have different capacitances and may be trimmed within a manufacturing process. The inductor may be disposed adjacent to the conductive tip and constituted by a ferrite core and a coil wound thereon.

The structure of the stylus 200, the arrangement of components, etc. may be modified in various forms including a circuit that responds to the magnetic fields in addition to those described above.

(a) of FIG. 4 illustrates a method for controlling a direction of current flowing through the plurality of first electrodes extending along the Y-axis to generate magnetic fields, and (b) of FIG. 4 illustrates a method for controlling a direction of current flowing through the plurality of second electrodes extending along the X-axis to generate electromagnetic fields.

In another embodiment, the magnetic fields may be generated by simultaneously controlling the directions of current flowing through the first electrode and the second electrode. As illustrated in the coordinates, in FIG. 4, a horizontal direction of the drawing indicates the Y-axis, and a vertical direction of the drawing indicates the X-axis.

The directions of current flowing through the plurality of first electrodes may be individually controlled. Here, the direction of the current flowing in the electrodes disposed at the left and right sides around a position P of the tip of the stylus 200 is reversely controlled. The direction of current flowing through each of the plurality of first electrodes of the touch panel 120 is controlled based on the position of the first electrode by using the tip of the stylus 200 as a center, Since the plurality of first electrodes disposed in parallel to each other does not form a closed loop, the individual current control has be performed for each of the plurality of first electrodes.

When the electromagnetic fields are generated in the manner that does not form the closed loop as in this embodiment, since the touch sensor according to the related art is used as it is, various types of electronic devices such as foldable or rollable (smartphone, TV, etc.) to achieve the same function. In addition, since the product can be produced using conventional production facilities and methods, it is possible to promote economic efficiency in manufacturing, and in another point of view, since it is possible to use the stylus through firmware upgrade for existing products that have only detected through touch by fingers, it has the effect of expanding the function of the existing product.

Referring back to (b) of FIG. 4, the direction of the current flowing through the first electrode disposed at the left side and the first electrode disposed at the right side, based on a virtual line parallel to the Y-axis passing through the tip of the stylus 200 are driven to be opposite to each other. Although the position of the tip of the stylus 200 is determined in advance to control the current direction of both the electrodes, the entire surface of the touch pad 120 may be divided into a plurality of areas, and the direction of the current of the electrodes respectively provided in the plurality of areas may be controlled so that the stylus 200 responds to the electromagnetic fields wherever the stylus 200 is disposed on the touch panel 120. A method for controlling the current directions of the electrodes disposed at a left edge and a right edge of the divided area in reverse directions may be exemplified, but is not limited thereto, and various applications and modifications may be considered.

As illustrated in (b) of FIG. 4, the directions of the current flowing through the plurality of second electrodes may also be individually controlled. Here, the directions for the current flowing through the electrodes disposed on upper and lower sides around the position P of the tip of the stylus 200 may be reversely controlled. In other words, the direction of the current flowing through the second electrode is adjusted based on the position of the second electrode by using the tip of the stylus 200 as a center.

Since the plurality of second electrodes disposed in parallel to each other does not form a closed loop, the individual current control is performed for each of the plurality of second electrodes.

In more detail, the current flowing through the second electrode disposed on a top surface and the second electrode disposed on a bottom surface based on the virtual line, which is parallel to the X-axis and passes through the tip of the stylus 200, is driven in directions opposite to each other. Here, in relation to the control of the current direction of each electrode, the control of the current direction may be performed for all the first electrodes and/or all the second electrodes, which are provided in the touch panel 120, but, if the position of the tip of the stylus 200 is known in advance, it is also possible to control only the electrodes at a predetermined distance from the tip of the stylus.

Similarly here, the entire surface of the touch pad 120 may be divided into a plurality of areas, and the direction of the current of the electrodes respectively provided in the plurality of areas may be controlled so that the stylus 200 responds to the magnetic fields wherever the stylus 200 is disposed on the touch panel 120. For example, a method for controlling the current directions of the electrodes disposed on an upper edge of the divided area and the electrodes disposed on a lower edge of the divided area in the opposite directions will be described as an example.

Since reverse current flows horizontally and/or vertically around the tip of the stylus 200, electromagnetic fields is generated, and as a result, current is induced in the resonance circuit 210 of the stylus 200 so that the stylus 200 generates an electromagnetic field signal. The current generated in the resonance circuit 210 of the stylus 200 may generate the electromagnetic fields around the inductor coil, and thus, a current signal is generated around the tip of the stylus 200. The current signal has a characteristic of rotating in a clockwise or counterclockwise direction around the tip of the stylus 200.

The electronic device 100 according to an embodiment of the present invention may determine coordinates at which the tip of the stylus 200 is disposed by receiving the current signal generated from the stylus 200 using the electrode of the touch panel 120. Hereinafter, a method for determining touch coordinates by receiving a signal generated by the stylus 200 activated by the touch panel 120 will be described in detail.

Detection of Signal from Stylus

According to an embodiment of the present invention, a signal is detected from the stylus using the touch panel.

Figure 5:
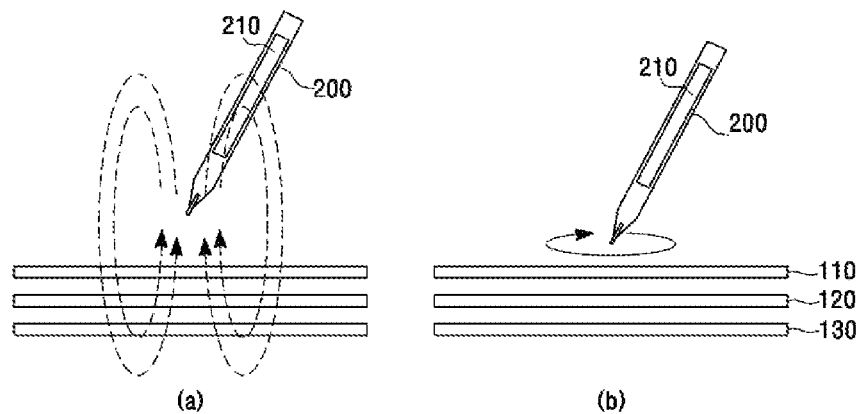
FIG. 5 is a schematic view for explaining a method for detecting a signal of the stylus in the electronic device according to an embodiment of the present invention.
Figure 6:
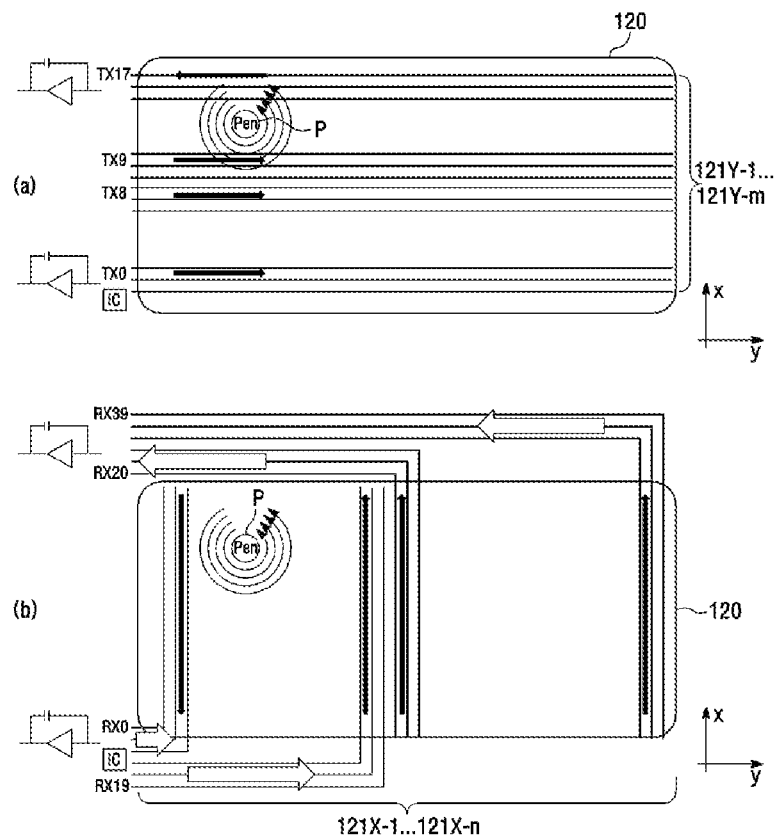
FIG. 6 is a view illustrating a current signal generated by magnetic fields that are generated by the stylus.
Figure 7:
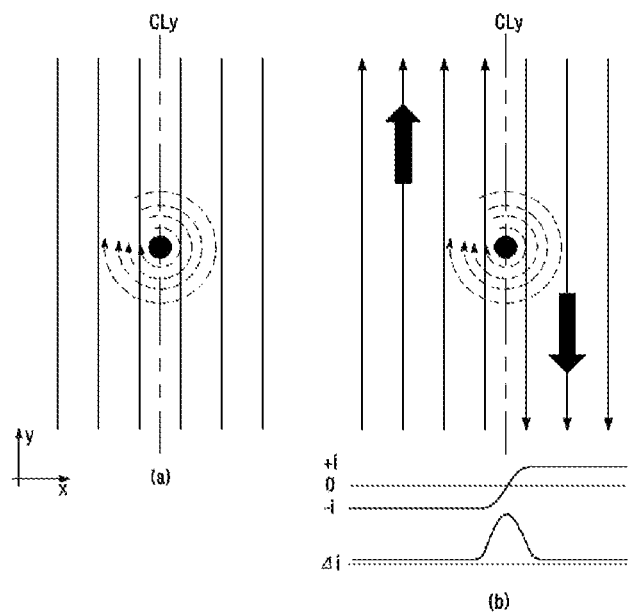
FIG. 7 is a view for explaining a current signal detected in a first electrode extending in a Y-axis direction when the stylus signal is received in the electronic device according to an embodiment of the present invention.
Figure 8:
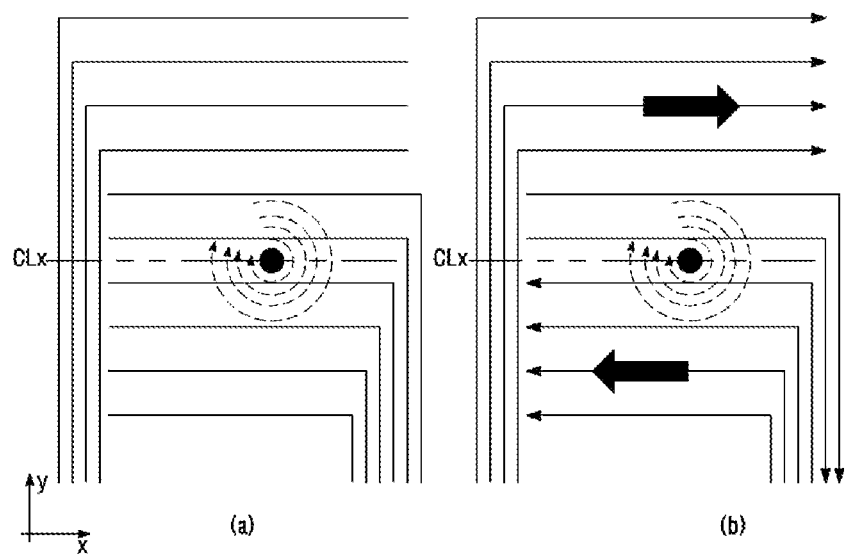
FIG. 8 is a view for explaining a current signal detected in a second electrode extending in an X-axis direction when the stylus signal is received in the electronic device according to an embodiment of the present invention.

FIG. 5 is a schematic view for explaining a method for detecting a signal of the stylus in the electronic device according to an embodiment of the present invention, and FIGS. 6 to 8 are views illustrating for explaining a method for detecting a signal from the stylus in the electronic device 100 according to an embodiment of the present invention.

When a direction of current flowing through the electrodes included in the touch panel 120 is individually controlled to induce the current into the resonance circuit 210 of the stylus 200 by the generated magnetic fields (the current value becomes the maximum value at the resonant frequency), as illustrated in (a) of FIG. 5, electromagnetic fields are induced around an inductor coil by the current generated in the resonance circuit 210 of the stylus 200, and the stylus 200 generates a current signal through the electromagnetic fields as illustrated in (b) of FIG. 5. Hereinafter, a method for acquiring touch coordinates by receiving a magnetic field signal of the stylus 200 will be described.

FIG. 6 is a view illustrating a current signal generated by the magnetic fields that are generated by the stylus 200. The electromagnetic fields generated by the current induced in the resonance circuit 210 of the stylus 200 generates a current signal rotating in the counterclockwise direction around the tip of the stylus 200 as illustrated in FIG. 6. In another embodiment, the current signal rotting in the clockwise direction may be generated. The current signal rotating in the clockwise or counterclockwise direction may be eddy current, but is not limited thereto.

The current signal rotating in the counterclockwise direction causes a current flow as illustrated in (a) of FIG. 6 with respect to the first electrodes 121Y-1 to 121Y-m of the touch panel 120. That is, the current signal rotating in the counterclockwise direction based on the position P of the tip of the stylus 200 passes through the tip of the stylus 200 and generates a current flow in opposite directions with respect to the first electrode disposed on the left surface based on the virtual line parallel to the Y-axis and the first electrode disposed on the right surface. The current signal rotating in the clockwise direction will generate an opposite current signal with respect to the first electrode of the touch panel 120.

Similarly, the current signal rotating in the counterclockwise direction causes a current flow as illustrated in (b) of FIG. 6 with respect to the second electrodes 121X-1 to 121X-n of the touch panel 120. That is, the current signal rotating in the counterclockwise direction based on the position P of the tip of the stylus 200 passes through the tip of the stylus 200 and generates a current flow in opposite directions with respect to the second electrode disposed on the top surface based on the virtual line parallel to the X-axis and the second electrode disposed on the bottom surface. The current signal rotating in the clockwise direction will generate an opposite current signal with respect to the second electrode of the touch panel 120. FIG. 7 is a diagram illustrating a current signal detected from the first electrode extending in the Y-axis direction when the stylus signal is received. The direction of the current flowing through the first electrode is changed according to the positional relationship with the tip of the stylus 200 by the current signal generated by the stylus 200 (here, rotating in clockwise direction around the tip).

Specifically, when the current rotating in the clockwise direction is generated as illustrated in (a) of FIG. 7 by the current signal generated by the stylus 200, the direction of the current flowing through the first electrodes disposed at the left and right sides with respect to the tip of the stylus 200 may be changed to correspond to the moving direction (rotation direction) of the current signal generated by the stylus 200. The current flowing through the first electrode disposed at a left surface with respect to a virtual line CLy parallel to the Y-axis passing through the tip of the stylus 200 is opposite to the direction of the current flowing through the first electrode disposed on a right surface.

In the signal received from each of n first electrodes, a rapid current change may occur at a position of the tip of the stylus 200 as illustrated in the lower graph of (b) of FIG. 7, and when coordinates corresponding to a peak value are found after differentiating the current change value, X coordinate values of the touch position by the stylus 200 may be confirmed.

Here, that the direction of the current flowing in the first electrode of the touch panel 120 corresponds to the rotating (moving) direction of the current signal may mean that the current direction corresponds so that, for example, if the current signal rotates in the clockwise direction around the tip of the stylus, the current flows upward in the electrode disposed at the left side in the tip of the stylus among the first electrodes, and the current flows downward in the electrode disposed at the right side. Conversely, if the current signal rotates in the counterclockwise direction around the tip of the stylus, the current direction may correspond so that the current flows downward in the electrode disposed at the left side of the tip of the stylus among the first electrodes, and the current flows upward in the electrode disposed at the right side among the first electrode.

If the current is described as circular motion in the clockwise direction around the tip of the stylus, the current flows upward to correspond to a tangent vector at a point of about 180 degree in a circular motion trajectory of the electrode disposed at the left side among the first electrodes, and the current flows downward to correspond to a tangent vector at a portion of about 0 degree in a circular motion trajectory of the electrode disposed at the right side.

FIG. 8 is a view for explaining a current signal detected in the second electrode extending in the X-axis direction when the stylus signal is received. According to the current signal generated by the stylus 200, the direction of the current flowing in the first electrode is changed according to the positional relationship with the tip of the stylus 200.

That is, the current flowing through the second electrodes disposed above and below the tip of the stylus 200 has a direction corresponding to the direction of rotation of the current signal induced by the electromagnetic fields of the stylus. Specifically, the current passing through the tip of the stylus 200 and flowing through the second electrode disposed on the top surface and the second electrode disposed on the bottom surface based on the virtual line CLx parallel to the X-axis rotate in opposite directions to correspond to the rotation direction of the current signal.

When a signal detected from each of the m second electrodes is analyzed, a rapid current change occurs at the tip of the stylus 200. After differentiating the detected current value, the coordinate values corresponding to the peak value are found and determined as the Y coordinate values of the touch position by the stylus 200.

That the direction of the current flowing in each of the second electrodes of the touch panel 120 corresponds to the rotating (moving) direction of the current signal, which is caused by the stylus 200, may mean that the current direction corresponds so that, for example, if the current signal rotates in the clockwise direction around the tip of the stylus, the current flows to a right side in the electrode disposed at the upper side in the tip of the stylus among the first electrodes, and the current flows to a left side in the electrode disposed at the lower side. Alternatively, if the rotation direction is changed, the direction of the current flowing in each electrode will also be reversed.

If the current is described as circular motion in the clockwise direction around the tip of the stylus, the current flows to the right side to correspond to a tangent vector at a point of about 90 degree in a circular motion trajectory of the electrode disposed at the upper side among the second electrodes, and the current flows to the left side to correspond to a tangent vector at a portion of about 270 degree in a circular motion trajectory of the electrode disposed at the lower side.

In an embodiment of the present invention, the stylus 200 may be activated using the touch panel electrode that does not form the closed loop, and the electromagnetic field signal of the stylus may be detected. That is, since n first electrodes aligned in parallel to each other and m second electrodes aligned orthogonal and parallel to the first electrodes receive individually the electromagnetic field signal of the stylus, the touch position of the stylus may be more precisely detected.

Figure 9:
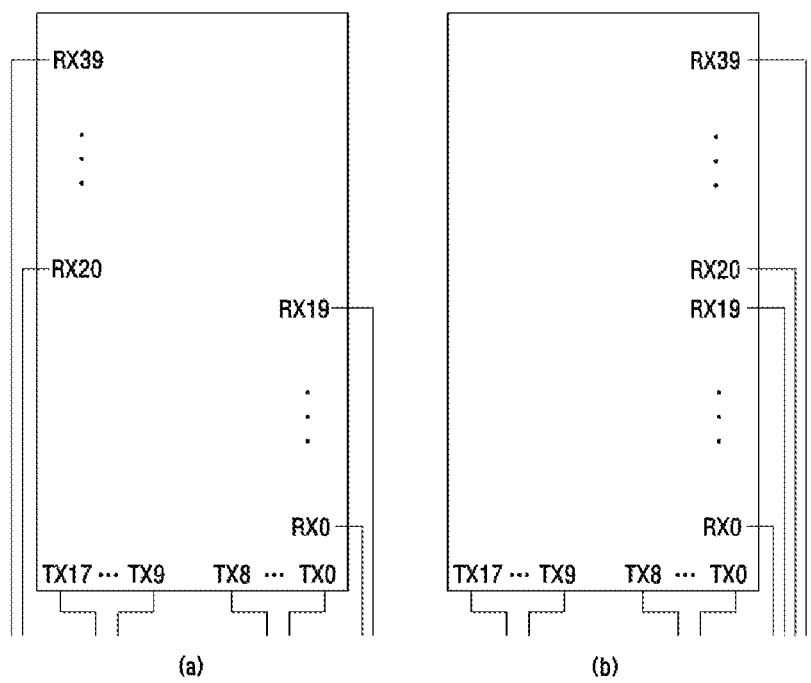
FIG. 9 is a view illustrating various line structures of the second electrode in the electronic device according to an embodiment of the present invention.

FIG. 9 is a view illustrating various line structures of the second electrode in the electronic device according to an embodiment of the present invention. FIG. 8 illustrates a structure in which lines of the plurality of second electrodes extending in parallel to the X-axis are connected to the left side of the second electrode disposed on the upper side with respect to the center of the touch panel 120, and the second electrode disposed at the lower side are connected to the right side, as illustrated in (a) of FIG. 9.

The line of the electrode may be changed in various manners, and as illustrated in (b) of FIG. 9, the lines may be connected only to the left side of the touch panel 120, and the lines may be connected only to the right side of the touch panel 120. In this case, a graph shape of the received signal may vary, but in any case, a signal pattern may rapidly change by using the point, at which the tip of the stylus 200 is disposed, as a boundary, and as a result, the touch coordinates may be determined.

Figure 10:
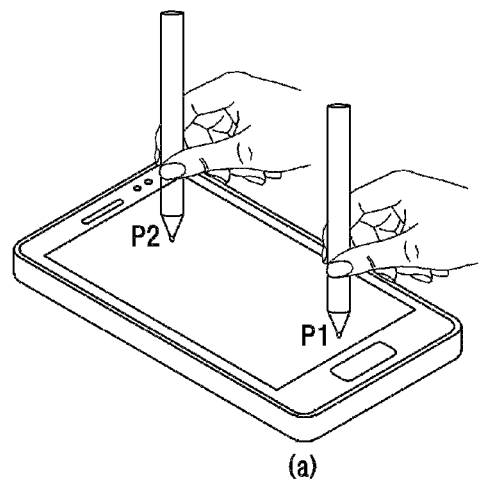
FIGS. 10 and 11 are views illustrating experimental procedures for verifying signal detection capability of the stylus using the electronic device and results obtained through the experimental procedures according to an embodiment of the present invention.
Figure 10:
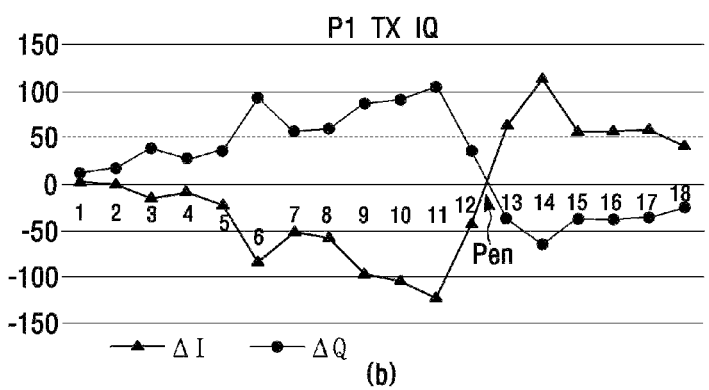
Figure 10:
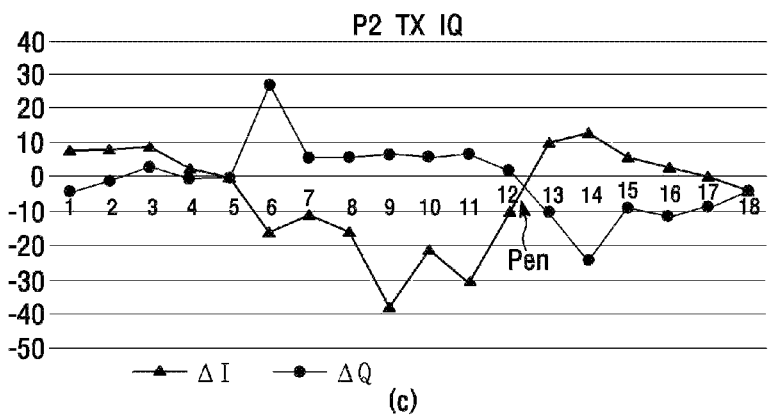
Figure 11:
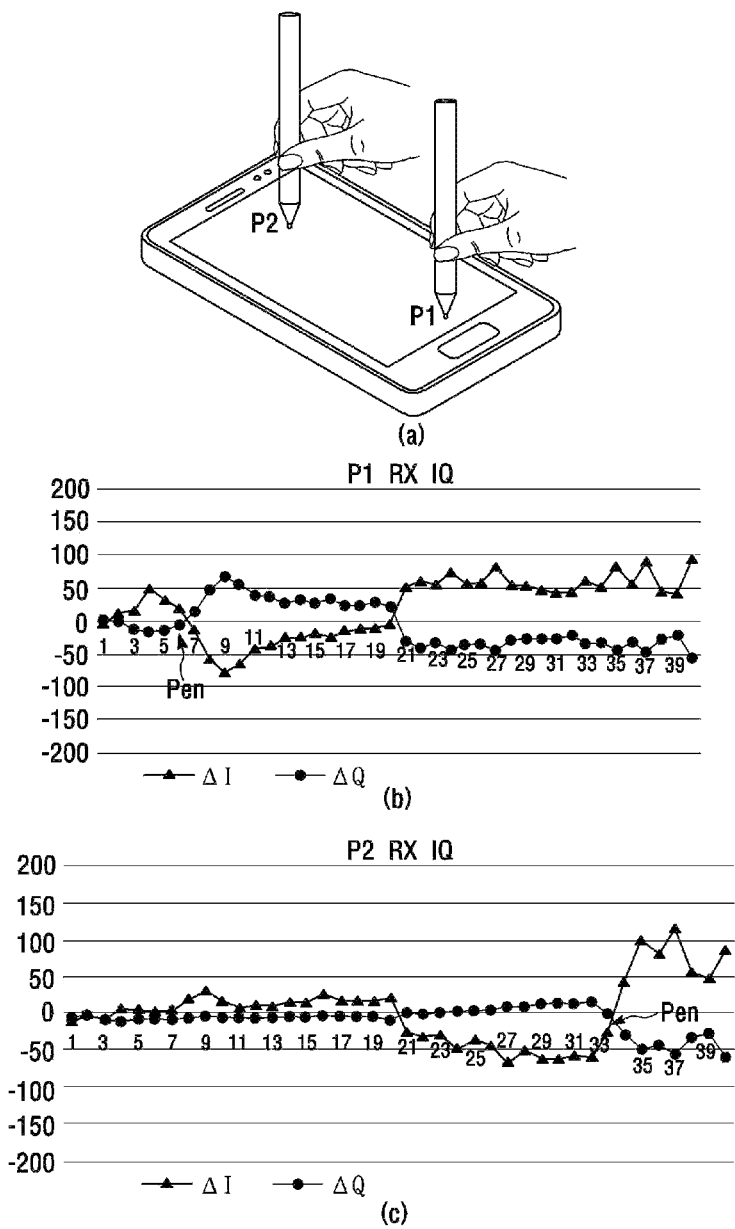

FIGS. 10 and 11 are views illustrating experimental procedures for verifying signal detection capability of the stylus using the electronic device and results obtained through the experimental procedures according to an embodiment of the present invention.

This experiment was conducted using a conventional EMR pen in which a resonance frequency is adjusted to about 400 kHz. As illustrated in (a) of FIG. 10, it was confirmed that a signal is detected after the EMR pen is disposed at a first position P1 and a second position P2 of the touch surface of the electronic device 100, and the EMR pen is activated by the electronic device 100 to emit a signal. This means that current is induced in the resonance circuit of the EMR pen by the electromagnetic fields generated by the touch panel 120. When the EMR pen is disposed at the first position P1, the signal received through the first electrode of the touch pad 120 may be analyzed to acquire a graph as shown in (b) of FIG. 10, and when comparing an X coordinate of the EMP pen identified by analyzing a point at which the signal changes rapidly with an X coordinate of the first position P1 of the EMR pen, the comparison results were coincided with each other.

The signal received by the touch panel 120 from the EMR pen at the second position P2 is shown in (c) of FIG. 10. As a result of comparing the X coordinate of the EMR pen identified at the point at which the signal changes rapidly with the X coordinate of the second position P2 of the EMR pen, the comparison results were coincided with each other.

The graphs in (b) and (c) of FIG. 10 are for IQ sampling signals. Here, each line represents a ΔI signal and a ΔQ signal, a vertical axis represents a magnitude of a signal value, and a horizontal axis represents a number obtained by numbering the first electrodes (18 electrodes) in order of arrangement.

FIG. 11 illustrates a signal received through the second electrode of the touch pad 120 in the same experiment. As illustrated in (a) of FIG. 11, a signal was detected after the EMR pen is disposed at the first position P1 and the second position P2 of the touch surface of the electronic device 100. A signal generated by the EMR pen was received through the second electrode of the touch pad 120. This means that current is induced in the resonance circuit of the EMR pen by the electromagnetic fields generated by the touch panel 120. Here, when the EMR pen is disposed at the first position P1, the signal received through the second electrode of the touch pad 120 may be analyzed to show a graph as shown in (b) of FIG. 11, and when comparing a Y coordinate of the EMP pen identified by analyzing a point at which the signal changes rapidly with a Y coordinate of the first position P1 of the EMR pen, the comparison results were coincided with each other.

Thereafter, the signal received from the second electrode of the touch panel 120 at the second position P2 appears as shown in (c) of FIG. 11. As a result of comparing the Y coordinate of the EMR pen identified at the point at which the signal changes rapidly with the Y coordinate of the second position P2 of the EMR pen, the comparison results were coincided with each other. The graphs in (b) and (c) of FIG. 11 are for IQ sampling signals. Here, each line represents a ΔI signal and a ΔQ signal, a vertical axis represents a magnitude of a signal value, and a horizontal axis represents a number obtained by numbering the second electrodes (40 electrodes) in order of arrangement.

FIGS. 10 and 11, it was confirmed that the stylus 200 is driven by the electronic device 100 according to an embodiment of the present invention, and as a result, a signal is accurately detected by the stylus 200.

An electronic device according to an embodiment of the present invention may determine a touch position by receiving various types of stylus signals. As described above, since the electronic device according to an embodiment of the present invention receives the signal of the stylus using a panel that does not form a closed loop, the touch sensor according to the related art may be used as it is, and the stylus may be used through firmware upgrades of the existing product that has only detected touches by fingers, and thus, there is an effect of expanding a function of the existing product.

The electronic device according to an embodiment of the present invention includes a panel including a plurality of first electrodes extending in the Y-axis and a plurality of second electrodes extending in the X-axis, and a determination part that determines touch coordinates based on the signal received from the stylus. Here, as described above, each of the plurality of first electrodes and the plurality of second electrodes does not form the closed loop.

Here, a current signal rotating in the clockwise or counterclockwise direction around the tip of the stylus is induced by the electromagnetic fields generated by the current induced in the resonance circuit of the stylus, and the determination part determines the touch coordinates based on the current signal.

Specifically, a current signal is generated by the magnetic fields generated by the stylus. The electromagnetic fields generated by the current induced in the resonance circuit of the stylus generates a current signal that rotates in the counterclockwise direction around the tip of the stylus. In another embodiment, the current signal rotting in the clockwise direction may be generated. The current signal rotating in the clockwise or counterclockwise direction may be eddy current, but is not limited thereto.

Here, the direction of the current flowing through the first electrode or the second electrode of the panel disposed at the upper, lower, left, and right sides of the tip of the stylus is determined to correspond to the direction of rotation of the current signal, and the current signal generated by the stylus causes a flow of current in an opposite direction of the first electrode disposed at the left surface and the first electrode disposed at the right surface with respect to a virtual line passing through the tip of the stylus and parallel to the Y-axis or causes a flow of current in an opposite direction of the second electrode disposed on the top surface and the second electrode disposed on the bottom surface with respect to a virtual line passing through the tip of the stylus and parallel to the X-axis.

The current induced to the first electrode and the second electrode may be detected to precisely detect the coordinates at which the tip of the stylus is disposed, and in this regard, as described in detail above, duplicated descriptions will be omitted.

In this case, the stylus may be an active stylus that resonates itself by including a resonance circuit and a power supply. The resonance circuit and the power supply are built in the active stylus pen. The power supply may be a battery, or may be a module (wired connection terminal, wireless charging module, etc.) that receives power from the outside in a wired or wireless manner. The active stylus may provide various additional functions such as a pen pressure, hovering, and buttons.

In another embodiment, the stylus may be a passive stylus including a resonance circuit that resonates with an external signal. The passive stylus may be driven in various manners such as an inductive resonance method, an electro-magnetic resonance (EMR) method, and a capacitive resonance method.

In the case of the passive stylus, since the power supply such as a battery is not built therein, a weight of the pen may be light and be operable anytime and anywhere.

When the passive stylus adopts the electro-magnetic resonance (EMR) method, as described above, the stylus may be activated by the electromagnetic fields generated by the panel 120. When the passive stylus adopts an electrically coupled resonance (ECR) method, the stylus may be activated by a signal transmitted by the electrode of the panel 120.

In a method for controlling an electronic device according to an embodiment of the present invention, the stylus is driven using the panel including the plurality of first electrodes extending in the Y-axis and the plurality of second electrodes extending in the X-axis, and then, a signal is received from the stylus. Here, the plurality of first electrodes provided in the touch panel do not form the closed loop, and the plurality of second electrodes do not also form the closed loop. In addition, the first electrode and the second electrode do not form the closed loop with each other.

The method for controlling the electronic device according to an embodiment of the present invention includes a driving process of individually controlling a direction of current flowing through a plurality of first electrodes or a plurality of second electrodes to generate electromagnetic fields, thereby activating a stylus, and a determination process of determining touch coordinates based on a signal generated from the stylus.

In the driving process, the direction of the current flowing through the first electrode or the second electrode may be individually adjusted based on a position of the first electrode or the second electrode around a tip of the stylus to generate electromagnetic fields, thereby driving the stylus. The driving of the stylus means that current is induced. or resonance occurs in an internal resonance circuit. Alternatively, the direction of the current flowing through the first electrode and the second electrode may be adjusted at the same time to generate the electromagnetic fields.

Although the plurality of first electrodes and the plurality of second electrodes, which provided in a touch panel, do not form a closed loop, the stylus may be driven only by controlling the direction of the current. That is, since the stylus is capable of being activated by generating the electromagnetic fields using the touch panel constituted by the open-loop electrodes (that is, ends of the plurality of first electrodes are not directly connected to each other, and ends of the plurality of second electrodes are not directly connected to each other), the touch panel according to the related art may be used as it is, and thus, components such as an expensive digitizer may not be required.

In the driving process, the first electrode disposed on the left surface and the first electrode disposed on the right surface based on the virtual line passing through the tip of the stylus and parallel to the Y-axis are driven in opposite directions to each other, or the second electrode disposed on the top surface and the second electrode disposed on the bottom surface based on a virtual line passing through the tip of the stylus and parallel to the X-axis are driven in opposite directions to generate the electromagnetic fields, thereby inducting or resonating the current in the resonance circuit.

When the stylus is activated by the driving process, the receiving process is performed.

The current is induced in the resonance circuit of the stylus by the electromagnetic fields, and the magnetic fields generated by the current induced in the resonance circuit induces the current signal rotating in the clockwise or counterclockwise direction around the tip of the stylus. In the receiving process, the touch coordinates are determined by receiving the current signal.

Here, the direction of the current flowing through the first electrode or the second electrode disposed vertically and horizontally around the tip of the stylus is determined in response to the rotation direction of the current signal. Specifically, the current flowing through the first electrode disposed on the left surface and the current flowing through the first electrode disposed on the right surface based on the virtual line passing through the tip of the stylus and parallel to the Y-axis may flow in opposite directions, and the current flowing through the second electrode disposed on the top surface and the current flowing through the second electrode disposed on the bottom surface based on the virtual line passing through the tip of the stylus and parallel to the X-axis may flow in opposite directions.

The method for driving the stylus according to various embodiments described above may be implemented in the form of program instructions that are capable of being executed through various computer means and may be recorded on a computer readable medium. A computer readable recording medium may include program instructions, data files, data structures, etc. alone or in combination. The program instructions recorded in the medium may be those specially designed and configured for the present disclosure or those known and usable to those skilled in computer software. Examples of computer-readable recording media include magnetic media such as hard disks, floppy disks, and magnetic tapes, optical media such as CD-ROMs and DVDs, and magneto-optical media such as floptical disks, and hardware devices specially configured to store and execute program instructions, such as ROM, RAM, flash memory, etc. The program command includes a machine language code created by a complier and a high-level language code executable by a computer using an interpreter. The above-described hardware device may be configured to be operated as at least one software module to perform an operation of the present invention, and vice versa. The method according to various embodiments described above may be implemented in the form of a computer program or application stored in the recording medium and executed by the computer.

In the stylus driving device and the electronic device according to the embodiment of the present invention, since the separate configuration such as the digitizer, the antenna, and the like is not required, the product may be miniaturized and thinned, the manufacturing cost may be reduced, and the stylus may be used while adopting the existing touch panel as it is.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a panel comprising a plurality of first electrodes extending in a Y-axis and a plurality of second electrodes extending in an X-axis;
a driving part configured to individually control a direction of current flowing through the plurality of first electrode and the plurality of second electrodes so as to generate electromagnetic fields, thereby driving a stylus; and
a determination part configured to receive a signal generated in the stylus so as to determine touch coordinates,
wherein each of the plurality of first electrodes and the plurality of second electrodes does not form a closed loop, and
wherein the driving part is configured to control the direction of the current flowing through the first electrode and the second electrode is controlled based on a position of the first electrode or the second electrode around a tip of the stylus to generate the electromagnetic fields.

2. The electronic device of claim 1, wherein the driving part is driven so that the current flowing through the first electrode disposed on a left surface and the first electrode disposed on a right surface based on a virtual line passing through the tip of the stylus and parallel to the Y-axis flow in opposite directions to each other, or the current flowing through the second electrode disposed on a top surface and the second electrode disposed on a bottom surface based on a virtual line passing through the tip of the stylus and parallel to the X-axis flow in opposite directions.

3. An electronic device comprising:
a panel comprising a plurality of first electrodes extending in a Y-axis and a plurality of second electrodes extending in an X-axis;
a driving part configured to individually control a direction of current flowing through the plurality of first electrode and the plurality of second electrodes so as to generate electromagnetic fields, thereby driving a stylus; and
a determination part configured to receive a signal generated in the stylus so as to determine touch coordinates,
wherein each of the plurality of first electrodes and the plurality of second electrodes does not form a closed loop,
wherein the current is induced in a resonance circuit of the stylus by the electromagnetic fields generated by the driving part, and magnetic fields generated by the current induced in the resonance circuit induces a current signal rotating in a clockwise or counterclockwise direction around the tip of the stylus, and
wherein the determination part is configured to receive the current signal so as to determinate the touch coordinates.

4. The electronic device of claim 3, wherein the direction of the current flowing through the first electrode or the second electrode disposed vertically and horizontally around the tip of the stylus is determined in response to the rotation direction of the current signal.

5. The electronic device of claim 4, wherein, due to a current signal generated in the stylus, the current flowing through the first electrode disposed on a left surface and the first electrode disposed on a right surface based on a virtual line passing through the tip of the stylus and parallel to the Y-axis flow in opposite directions to each other, or the current flowing through the second electrode disposed on a top surface and the second electrode disposed on a bottom surface based on a virtual line passing through the tip of the stylus and parallel to the X-axis flow in opposite directions.

6. A stylus driving device comprising:
a panel comprising a plurality of first electrodes extending in a Y-axis and a plurality of second electrodes extending in an X-axis; and
a driving part configured to individually control a direction of current flowing through the plurality of first electrode and the plurality of second electrodes so as to generate electromagnetic fields, thereby driving a stylus,
wherein each of the plurality of first electrodes and the plurality of second electrodes does not form a closed loop, and
wherein the driving part is configured to control the direction of the current flowing the first electrode and the second electrode is controlled based on a position of the first electrode or the second electrode around a tip of the stylus to generate the electromagnetic fields.

7. The stylus driving device of claim 6, wherein the driving part is driven so that the current flowing through the first electrode disposed on a left surface and the first electrode disposed on a right surface based on a virtual line passing through the tip of the stylus and parallel to the Y-axis flow in opposite directions to each other, or the current flowing through the second electrode disposed on a top surface and the second electrode disposed on a bottom surface based on a virtual line passing through the tip of the stylus and parallel to the X-axis flow in opposite directions.

8. An electronic device comprising:
a panel comprising a plurality of first electrodes extending in a Y-axis and a plurality of second electrodes extending in an X-axis; and
a determination part configured to receive a signal generated in the stylus so as to determine touch coordinates,
wherein each of the plurality of first electrodes and the plurality of second electrodes does not form a closed loop, and
wherein a current signal rotating in a clockwise or counterclockwise direction around a tip of the stylus is induced by electromagnetic fields generated by current induced in a resonance circuit of the stylus, and the determination part is configured to determines touch coordinates based on the current signal.

9. The electronic device of claim 8, wherein a direction of current flowing through the first electrode or the second electrode disposed vertically and horizontally around the tip of the stylus is determined in response to the rotation direction of the current signal.

10. The electronic device of claim 9, wherein, due to a current signal generated in the stylus, the current flowing through the first electrode disposed on a left surface and the first electrode disposed on a right surface based on a virtual line passing through the tip of the stylus and parallel to the Y-axis flow in opposite directions to each other, or the current flowing through the second electrode disposed on a top surface and the second electrode disposed on a bottom surface based on a virtual line passing through the tip of the stylus and parallel to the X-axis flow in opposite directions.

11. The electronic device of claim 8, wherein the stylus comprises an active stylus configured to resonate itself by comprising a resonance circuit and a power supply.

12. The electronic device of claim 8, wherein the stylus comprises a passive stylus comprising a resonance circuit configured to resonate by an external signal.

13. The electronic device of claim 12, wherein the external signal comprises an electromagnetic field signal generated in the panel.

* * * * *